(12) United States Patent
Marshall et al.

(10) Patent No.: US 6,293,349 B1
(45) Date of Patent: Sep. 25, 2001

(54) EDGER

(75) Inventors: James Marshall, Mallorytown; Richard Rosa, Kingston; Jacob R. Prosper, Brockville, all of (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/374,194

(22) Filed: Aug. 13, 1999

(51) Int. Cl.$^7$ .......................... A01D 34/10; A01D 34/47
(52) U.S. Cl. .................. 172/15; 172/41; 172/123
(58) Field of Search .................. 172/15, 13, 41, 172/42, 123; 56/17.5, 256, 1, DIG. 17, DIG. 12, DIG. 20; 15/182, 179, 183, 197, 198, 200

(56) References Cited

U.S. PATENT DOCUMENTS

| | | | |
|---|---|---|---|
| D. 172,275 | 5/1954 | Gabbert et al. | |
| D. 201,693 | 7/1965 | Abrahamsen et al. | D40/1 |
| D. 206,890 | 2/1967 | Adams et al. | D40/1 |
| D. 225,295 | 12/1972 | Boldt | D8/8 |
| D. 234,018 | 12/1974 | DeBrey | D8/8 |
| D. 249,012 | 8/1978 | Everts | D8/8 |
| D. 349,220 | 8/1994 | Griffin | D8/8 |
| D. 349,221 | 8/1994 | Griffin | |
| D. 354,892 | 1/1995 | Griffin | D8/8 |
| D. 360,563 | 7/1995 | Griffin et al. | D8/8 |
| D. 372,405 | 8/1996 | Notaras et al. | D8/1 |
| D. 380,129 | 6/1997 | Meisner et al. | D8/8 |
| D. 382,450 | 8/1997 | Meisner et al. | D8/8 |
| D. 398,817 | 9/1998 | Meisner et al. | D8/8 |
| D. 414,088 | 9/1999 | Juratovac et al. | D8/8 |
| D. 414,388 | 9/1999 | Wright | D8/8 |
| 791,791 | 6/1905 | Hurford | |
| 1,493,670 | 5/1924 | Galvin | |
| 1,505,685 | 8/1924 | Allen | |
| 1,816,054 | 7/1931 | Pelkey | |
| 2,043,148 | 6/1936 | Blondeau | |
| 2,480,877 | 9/1949 | Peterson | |
| 2,706,941 | 4/1955 | Swanson | |
| 3,006,421 | 10/1961 | Feilbach | 172/15 |
| 3,068,504 | 12/1962 | Peterson | |
| 3,627,055 | 12/1971 | Lay | |
| 3,788,049 | 1/1974 | Ehrlich | |
| 3,812,917 | 5/1974 | Strate | 172/15 |
| 4,037,667 | 7/1977 | Gonsalves et al. | 172/14 |
| 4,043,103 | 8/1977 | Lakin et al. | 56/295 |
| 4,278,133 | 7/1981 | de Marcellus | 172/14 |
| 4,463,544 | 8/1984 | Carsello et al. | 56/17.1 |
| 4,504,997 | 3/1985 | Weiler | 15/179 |
| 4,712,363 | 12/1987 | Claborn | 56/16.7 |
| 4,817,235 | 4/1989 | Doxey et al. | 15/387 |
| 4,914,899 | 4/1990 | Carmine | |
| 4,979,573 | 12/1990 | Williamson | 172/15 |
| 5,029,435 | 7/1991 | Buchanan | 56/12.1 |
| 5,081,829 | 1/1992 | Grube | 56/256 |
| 5,156,218 | 10/1992 | Metzler et al. | 172/15 |
| 5,226,486 | 7/1993 | Naiser | 172/15 |
| 5,325,928 | 7/1994 | Wagster et al. | 172/15 |
| 5,351,762 | 10/1994 | Bean | 172/17 |
| 5,406,669 | 4/1995 | Lesiw | 15/179 |
| 5,520,253 | 5/1996 | Kesting | 172/125 |
| 5,577,374 | 11/1996 | Huston | 56/12.1 |
| 5,842,331 | 12/1998 | Klee | 56/16.9 |

Primary Examiner—Christopher J. Novosad
(74) Attorney, Agent, or Firm—Harness, Dickey & Pierce P.L.C.

(57) ABSTRACT

An electrically powered lawn edger (10) having a wire wheel (26) specifically adapted for edging and trench cutting applications. The wire wheel includes pairs of twisted wire brush segments (34) which are held within a hub (32) of the wire wheel. The pairs of brush segments are spaced apart radially around a peripheral edge of the hub to produce evenly spaced gaps (36). The gaps help to prevent the edger from "loading up" with dirt and/or turf when edging or cutting a trench and possibly stalling the edger motor (21). A washer (40) having a key shaped boss (44) keys the wire wheel to an output spindle (21*a*) of the motor to prevent slippage of the wire wheel.

23 Claims, 8 Drawing Sheets

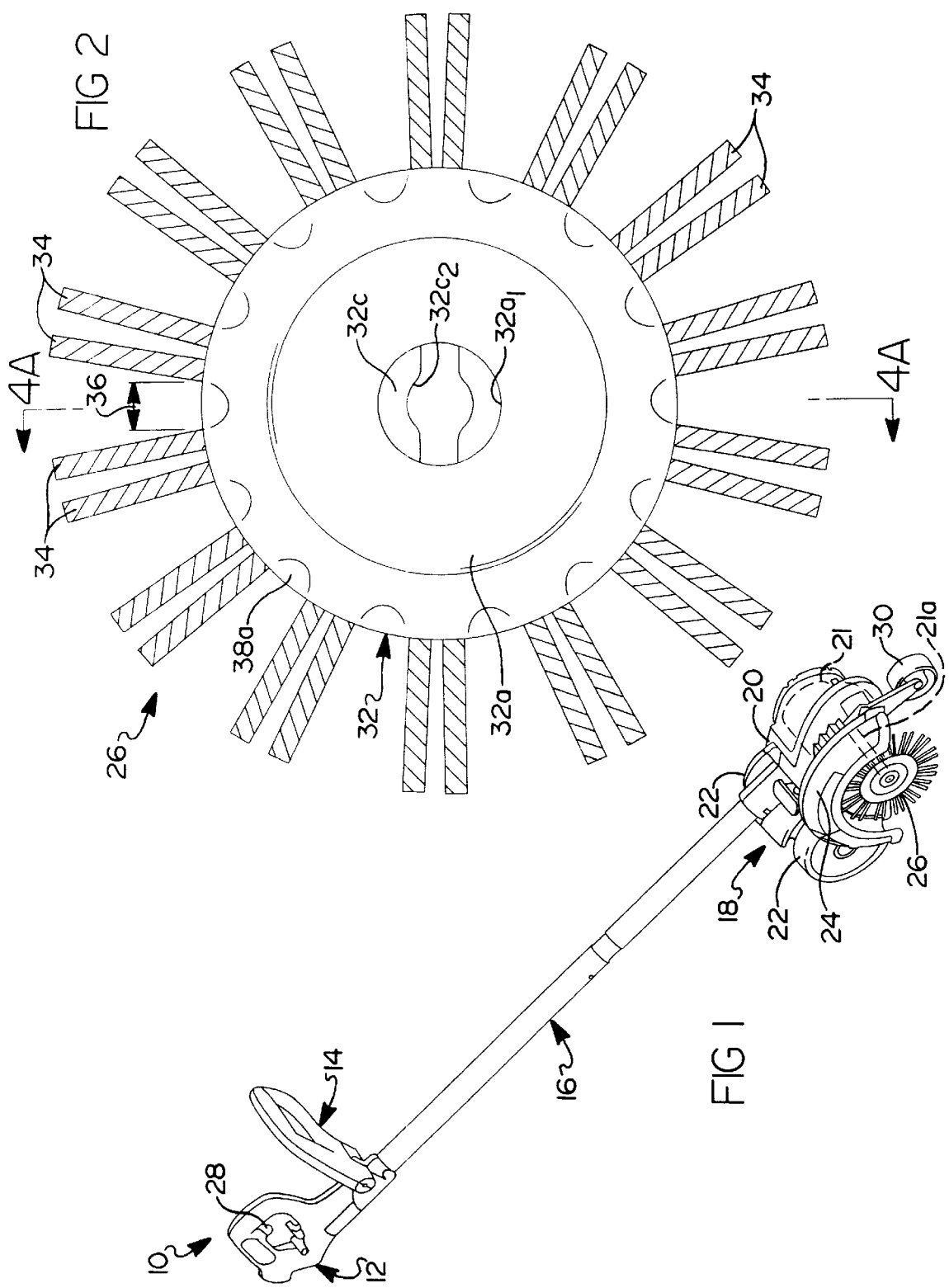

EDGER

TECHNICAL FIELD

This invention relates generally to lawn edgers, and more particularly to an electrically powered lawn edger having a removable wire wheel adapted to cut trenches and to edge along concrete and asphalt surfaces without drawing excessive current from an electric motor of the edger, and also to a system for more positively coupling various edging implements to an output spindle of the electric motor while still permitting such implements to be quickly and easily removed and attached to the spindle.

BACKGROUND OF THE INVENTION

Edgers are used in applications to trim turf growing along a walkway or a driveway where it is desired to produce a clean "edged" appearance to the turf. Such edgers are also often used to cut trenches through turf and into soil to enable cables or wiring to be laid in the soil.

Previously developed edgers, however, have suffered from certain drawbacks when the edger has been used with a wire brush wheel. Wire brush wheels presently available typically include a large number of twisted wire brush segments that are not particularly well suited for use with electrically powered edgers. The large number of wire brush segments are prone to "loading up" with soil and/or turf during use, often temporarily stalling the edger. When this occurs, the edger can also "kick" back toward the user, making use of the edger uncomfortable and tiring.

Such previously developed wire wheels having a large number of wire brush segments also produce a greater current draw on the electric motor of the edger during use than other cutting implements. This can limit the use of many wire wheels to those edgers having motors sufficiently powerful enough to handle the anticipated current draw that will result when using a wire wheel. If the wire wheel becomes momentarily loaded up or stalled during use, the current drawn by the motor will increase significantly and can potentially damage the edger motor.

The problem with excessive current draw with many previously designed wire wheels is further compounded when the edger is used to cut trenches in rocky or stony soil. In these instances, the contact of the wire wheel with stones or rocks increases the risk of loading up or stalling of the motor of the edger, thus increasing the risk of damage to the motor and/or damage to the wire wheel. Stalling can also occur if the wire wheel must cut into hard, compacted soil.

Another disadvantage concerning some previously developed edgers is the somewhat inconvenient process of changing edging implements and/or slippage of the edging implement relative to the spindle of the electric motor driving it. Such edgers often incorporate a number of independent washers and/or threaded nuts for holding the edging implement securely to the motor spindle, which makes changing the edging implement a time consuming and inconvenient process. Often some slippage of the edging implement occurs regardless of how tight the user is able to fasten the edging implement onto the spindle. This slippage can reduce the efficiency of the edger and thus lengthen the time and effort required to complete an edging/trenching task.

In view of the foregoing, it is a principal object of the present invention to provide an edger having a wire wheel which has a reduced number and novel arrangement of wire brush segments which requires less power to be driven by an electric motor than conventional wire wheels used with electric edgers.

It is a further object of the present invention to provide an edger having a wire wheel which is less likely to become momentarily loaded up with soil or turf, or possibly stalled, when digging trenches or edging in hard soil, thereby preventing an unacceptably high current draw by the electric motor of the edger.

It is still another object of the present invention to provide an edger having a wire wheel which may be quickly and easily removed from an output spindle of the electric motor of the edger so that various edging implements such as edging blades and wire wheel brushes can be more quickly and easily attached to the spindle, and where the edging implement is even more securely held to the spindle to prevent undesired slippage of the edging implement relative to the spindle.

SUMMARY OF THE INVENTION

The present invention is directed to a lawn edger having a wire brush wheel and a means for securing the wire wheel, or virtually any other edging implement, quickly and easily to a spindle of an electric motor of the edger in such a manner that slippage of the edging implement relative to the spindle is prevented. The wire wheel of the present invention incorporates a plurality of wire brush segments which are spaced in desired numbers radially about a hub of the wire wheel. In one preferred embodiment, pairs of wire brush segments are positioned closely adjacent one another, with each pair being spaced evenly from its adjacent pair by a predetermined distance. In this manner the overall number of brush segments is reduced while forming "gaps" between each adjacent pair of brush segments. These gaps help to prevent the wire wheel from getting bogged down or stalled when cutting into hard, compacted soil, which could result when using other conventional wire wheels, and thus preventing the edger motor from drawing excessive current.

In the preferred embodiment each twisted wire brush segment comprises a diameter of preferably between about 0.125 inch and 0.5 inch (3.175 mm–12.7 mm). Even more preferably, the diameter of each twisted wire brush segment ranges from about 0.25 inch to 0.375 inch (6.35 mm–9.525 mm). Preferably, the gap between each pair of adjacent wire brush segments is between about 0.5 inch–75 inch (12.7 mm–19.05 mm), and more preferably between about 0.625 inch (15.875 mm), depending on the overall diameter of the wire wheel. These gaps enable dirt and small stones to be readily lifted out by the wire wheel when cutting through hard or highly compacted soil or turf, thus reducing the chance of loading up and stalling of the edger motor.

Each of the wire brush segments are secured to a hub having inner and outer plates and a center plate secured therebetween. The brush segments extend outwardly through openings in the center plate. Preferably, the diameter of each of the inner and outer plates is slightly larger than the diameter of the center plate. Between adjacent pairs of wire brush segments the peripheral edges of the inner and outer plates of the hub are narrowed or "crimped in" slightly toward each other. These narrowed areas help to provide support to the brush segments to maintain the brush segments upright during use of the wire wheel.

In the preferred embodiment, the hub of the wire wheel includes a keyed opening. The spindle of the motor also includes a cross sectional shape which is such that it requires the wire wheel to be placed on the shaft in a particular orientation. A washer having a key shaped boss is also included. The key shaped boss has a shape, when viewed in cross section, which is designed to fit within the keyed opening of the hub such that the washer is not able to rotate independently of the wire wheel when both are placed on the spindle. A threaded fastening member is then used to secure the wire wheel to the motor spindle. In this manner, both the keyed washer and the wire wheel are prevented from rotating independently relative to the output shaft and to each other. This arrangement further enables the wire wheel to be quickly and easily removed and replaced with another edging implement, such as an edging blade, to suit the needs of a specific edging task.

The edger of the present invention thus enables a wire wheel to be used to edge closely adjacent to areas such as concrete, paving stones, asphalt, etc., or to cut trenches in soil without experiencing the loading up or stalling caused by other wire wheels driven by electric edger motors. The wire wheel of the present invention requires less power than traditional wire wheels, thus enabling the wire wheel to be used with edgers having less powerful electric motors. The keyed design of the opening in the hub of the wire wheel, together with the keyed washer, enables the wire wheel to be held securely to the motor spindle while still enabling the wire wheel to be quickly and easily removed when changing edging implements.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of an edger incorporating a wire wheel in accordance with a preferred embodiment of the present invention;

FIG. 2 is a plan view of an outer side of the wire wheel shown in FIG. 1;

DETAILED DESCRIPTION OF THE PREFERRED EMBODIMENTS

Figure 3:
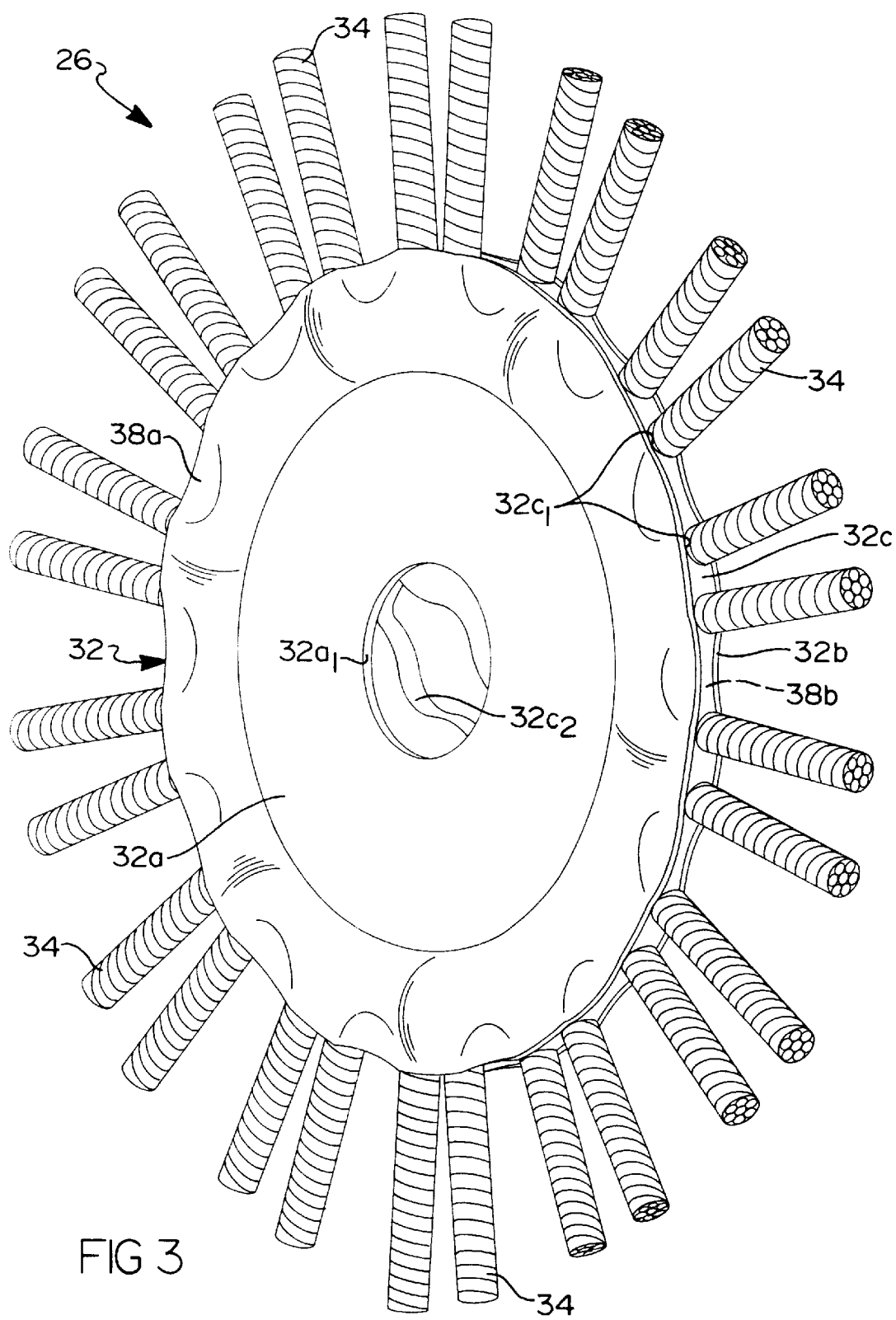
FIG. 3 is a perspective view of the wire wheel shown in FIG. 2.

Referring to FIGS. 1, there is shown an edger 10 in accordance with a preferred embodiment of the present invention. The edger 10 includes a main handle portion 12, a secondary handle portion 14, an elongated, tubular neck portion 16, and an edging assembly 18 coupled to the neck portion 16. The edging assembly 18 includes a housing 20 within which is disposed an electric motor 21 (indicated in phantom) having a spindle (i.e., armature shaft) 21a. A pair of wheels 22 operationally coupled to the housing 20 support the entire edger assembly 18 to permit rolling movement along a surface such as a driveway or sidewalk. A shroud 24 secured to the housing 20 partially encloses a wire wheel 26 which is coupled to the spindle 21a so as to be driven thereby. The electric motor 21 is actuated by a manual trigger 28 at the main handle portion 12 to permit on/off control of the electric motor 21. A guide wheel assembly 30 assists the user in moving the edger 10 closely adjacent the edge of a walkway or driveway.

While the edger 10 is shown in FIG. 1 without a rechargeable battery pack, it will be appreciated that the edger 10 could readily be modified to incorporate such a rechargeable power source to enable the edger 10 to be used when an AC power source is not readily available. If a removable, rechargeable battery pack is included, then an AC/DC converter could also be incorporated for use with the edger 10 to enable the edger to be powered by either an AC or DC power source. It will be appreciated, however, that incorporating such an AC/DC power converter would require the tool to be double insulated to meet existing safety standards, as is well known in the art.

Figure 4:
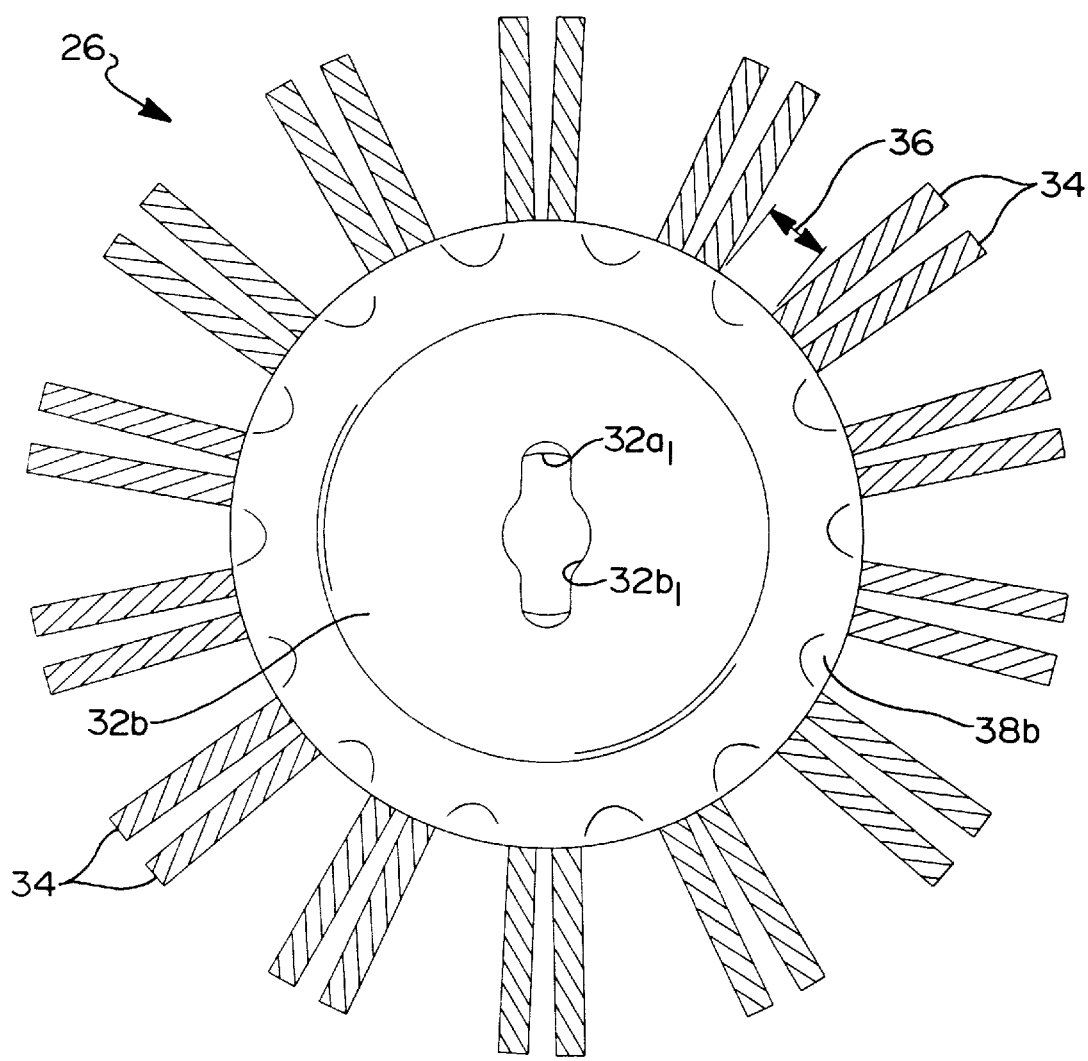
FIG. 4 is a plan view of the inner side of the wire wheel shown in FIG. 1.

Referring now to FIGS. 2, 3 and 4, the wire wheel 26 is shown in greater detail. Referring specifically to FIG. 3, the wire wheel 26 includes a hub 32 which is preferably formed from metal or aluminum, such as by molding or stamping. The hub 32 includes an outer plate 32a, an inner plate 32b and a center plate 32c sandwiched between the inner and outer plates 32b and 32a, respectively. The center plate 32c is preferably slightly smaller in diameter than the inner and outer plates 32b and 32a, respectively. The plates 32a, 32b and 32c are secured together by welding or other suitable conventional fastening elements. The center plate 32c includes a plurality of radially spaced apart openings $32c_1$. A twisted wire brush segment 34 extends through each opening $32c_1$. The brush segments 34 are formed from thin steel wire strands (which are twisted to form a relatively rigid brush segment). Each brush segment 34 comprises an overall diameter of preferably between about 0.125 inch–0.5 inch (3.175 mm–12.7 mm), and more preferably between about 0.250 inch–0.375 inch (6.35 mm–9.525 mm). The overall length of each brush segment 34 may vary considerably, but is preferably between about 1.0 inch–1.5 inches (25.4 mm–38.1 mm), and more preferably about 1.25 inches (31.75 mm). In the preferred embodiment 28 brush segments 34 are provided, but it will be appreciated that a greater or lesser number could be used depending on the diameter of the hub 32.

Figure 4A:
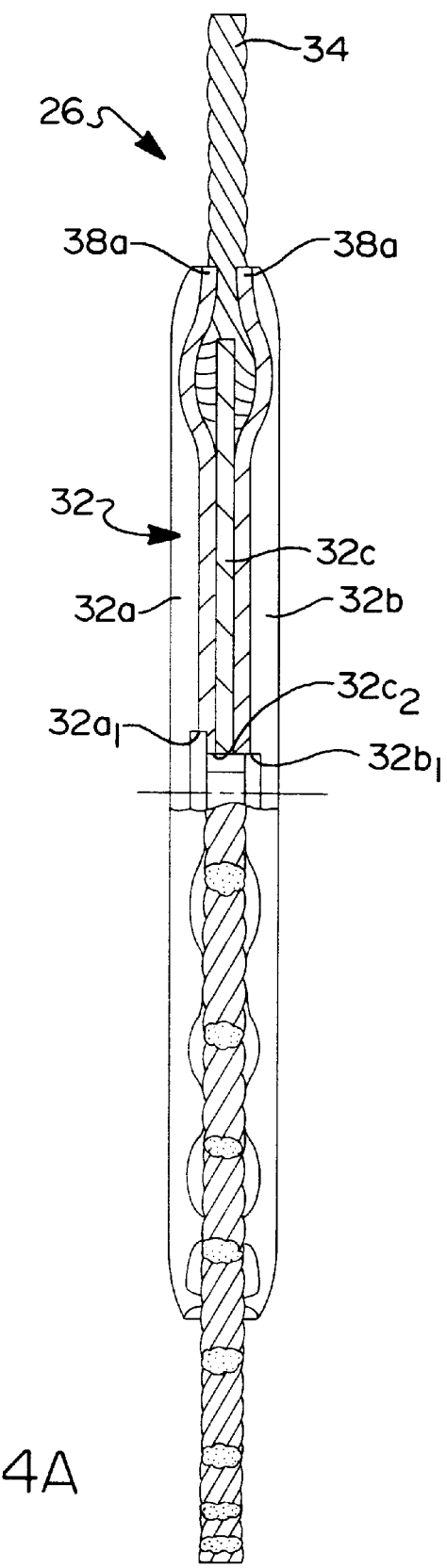
FIG. 4a is a cross-sectional view of the wire wheel in accordance with section line 4a—4a in FIG. 2.

The brush segments 34 are arranged closely adjacent one another in pairs such that "gaps" or spaces, designated by dimensional arrow 36 (FIG. 2), are formed radially about the hub 32. At these gaps 36, the peripheral edges 38a and 38b of the plates 32a and 32b, respectively, of the hub 32 are "crimped" or narrowed slightly, as best seen in FIGS. 3 and 4a. This crimping is advantageous because it provides additional support to the brush segments 34 to further help keep them upright and rigid during use of the wire wheel 26. The gaps 36 are important because they provide space for the removal of dirt and vegetation churned up as the wire wheel 26 digs through dirt and turf. This helps to prevent the wire wheel 26 from becoming momentarily stuck in the soil and/or turf, thus causing the edger motor 21 to draw excessively high current. It has been found that the distance of the gap 36 may vary considerably, but for a wire wheel 26 having a hub with an outer diameter of about 4.7 inches (119.4 mm ), and wire brush segments 34 each having a diameter of about 0.25 inch (6.35 mm), and with the wire brush segments 34 being arranged in pairs as illustrated in FIG. 2 with a slight spacing of about 0.125 inch (3.175 mm) between each one of the brush segments 34, the length of each gap 36 is preferably about 0.5 inch–0.75 inch (12.7 mm–19.05 mm), and more preferably about 0.625 inch (15.875 mm). The brush segments 34 are captured within the hub 32 by looping through apertures formed in the peripheral edge of the center plate 32c in conventional fashion.

It will also be appreciated that while the wire wheel 26 has been illustrated as having pairs of brush segments 34 spaced around the periphery of the hub 32, that a greater or lesser number of brush segments 34 could be grouped together around the hub 32. For example, groups of three brush segments 34 could be disposed around the hub 32 periphery rather than groups of two. Using groups of three or more brush segments 34, however, would reduce the space available to form the gaps 36 (assuming the diameter of the hub 32 remained the same), which would reduce the ability of the wire wheel 26 to resist "loading up" or stalling during use.

Referring further to FIGS. 2 and 3, the outer plate 32a includes a circular aperture $32a_1$ while the center plate 32c can be seen to include an aperture $32c_2$ having a "kermit eye" shape. Referring to FIG. 4, the inner plate 32b is illustrated as also having a kermit eye shaped aperture $32b_1$ which is aligned over the aperture $32c_2$ in the center plate 32c.

Figure 5:
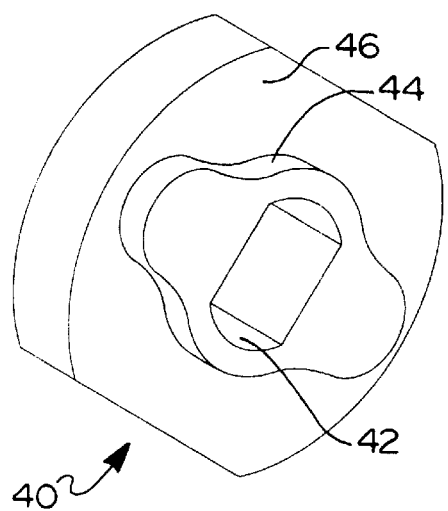
FIG. 5 is a perspective view of a keyed washer used to key the wire wheel to the motor spindle of the edger.
Figure 7:
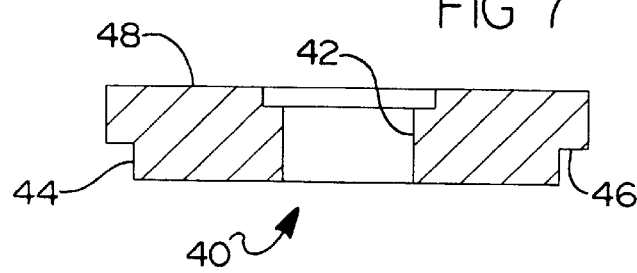
FIG. 7 is a cross sectional side view of the keyed washer of FIG. 6 taken in accordance with section line 7—7 in FIG. 6.
Figure 6A:
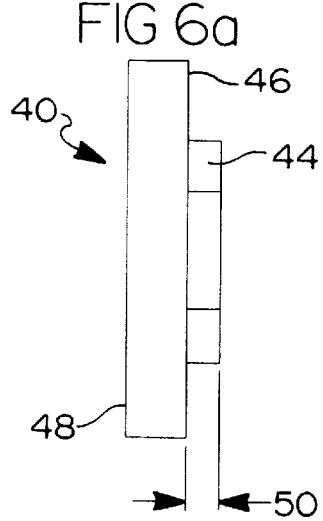
FIG. 6a is a side view of the keyed washer of FIG. 5.
Figure 6:
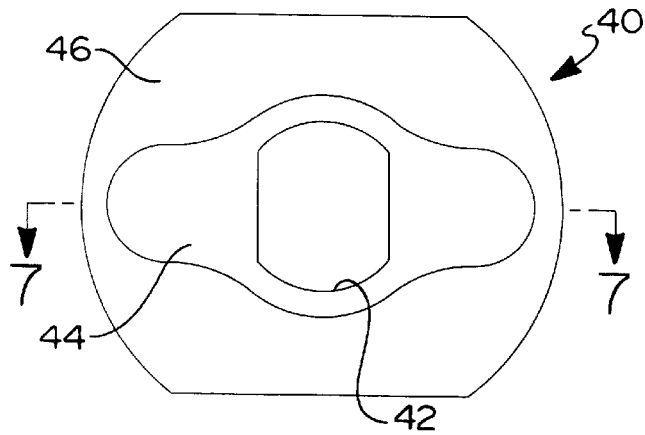
FIG. 6 is a plan view of the keyed washer of FIG. 5.

Referring now to FIGS. 5–7, a keyed washer 40 is illustrated. The keyed washer 40 is used to lock the wire wheel 26 to the spindle 21a of the motor 21. In this regard it will be appreciated that the spindle 21a of the motor 21 has two flattened or shaved surfaces along a distal portion of its length to impart a double "D" shape to at least the distal portion when it is viewed in cross section. This shape is identical, but just slightly smaller than, an aperture 42 having a double D shape formed in the keyed washer 40. In this manner, the keyed washer 40 can only be inserted onto the spindle 21a in one of two possible orientations (180° from one another) and the double D configuration prevents rotation of the keyed washer 40 independently of the spindle 21a.

With further reference to FIGS. 5–7, the keyed washer 40 also includes a raised boss portion 44 on a first surface 46 thereof. A second (i.e., rear) surface 48 is generally flat except for the area defining the double D shaped aperture 42. The boss portion 44 is illustrated also having a "kermit eye" shape, but it will be appreciated that virtually any other shape could be incorporated that accomplishes the function of keying the keyed washer 40 to the wire wheel 26, as will be described further momentarily. The boss portion 44 has a height, as indicated by dimensional arrows 50 in FIG. 6a, which is sufficient to at least partially engage within the keyed aperture $32c_2$ in the center plate 32c (FIG. 3). The keyed washer 40 is preferably made from metal or other suitably strong material.

When the keyed washer 40 is secured to the spindle 21a of the electric motor 21 of the edger 10, the washer 40 is not only keyed to the spindle 21a but is also keyed to the wire wheel 26. Therefore, the keyed washer 40 is not able to rotate independently of the spindle 21a nor independently of the wire wheel 26.

Figure 9:
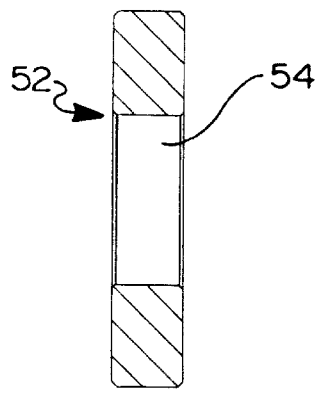
FIG. 9 is a cross sectional side view of the washer of FIG. 8 taken in accordance with section line 9—9 in FIG. 8.
Figure 8:
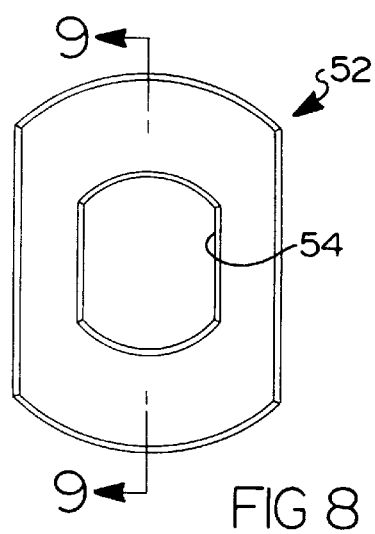
FIG. 8 is a plan view of an outer washer used to help secure the wire wheel to the motor spindle.

Referring now to FIGS. 8 and 9, an outer or clamping washer 52 is illustrated. The outer washer 52 is also shaped in the double D configuration and includes a double D shaped aperture 54 just slightly larger in dimensions than the spindle 21a of the motor 10. When inserted over the spindle 21a, the outer washer 52 is keyed to the spindle 21a. The washer 52 is also preferably made from metal or another suitably high strength material.

Figure 10:
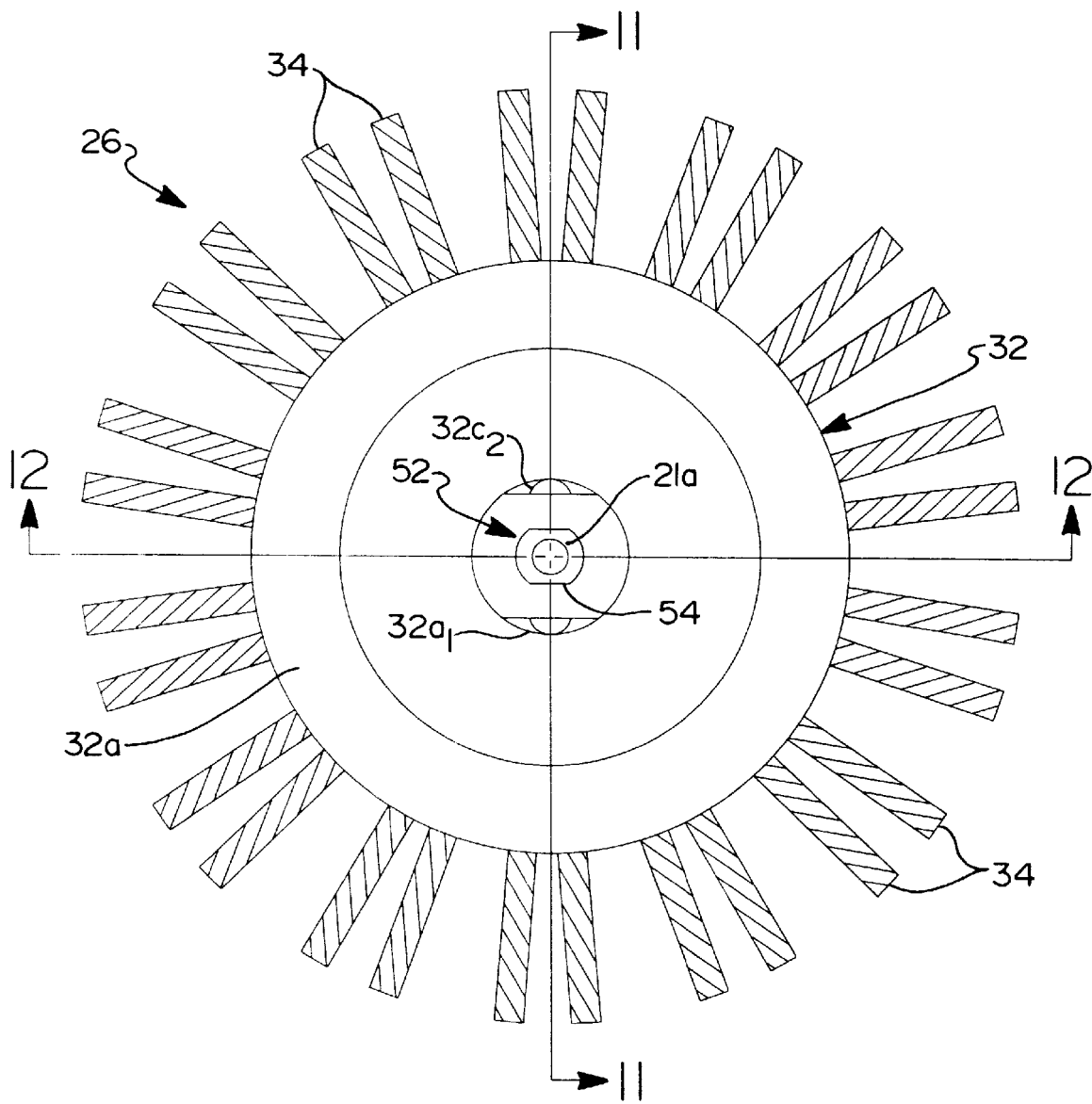
FIG. 10 is a plan view of the wire wheel assembled onto the motor spindle.
Figure 11:
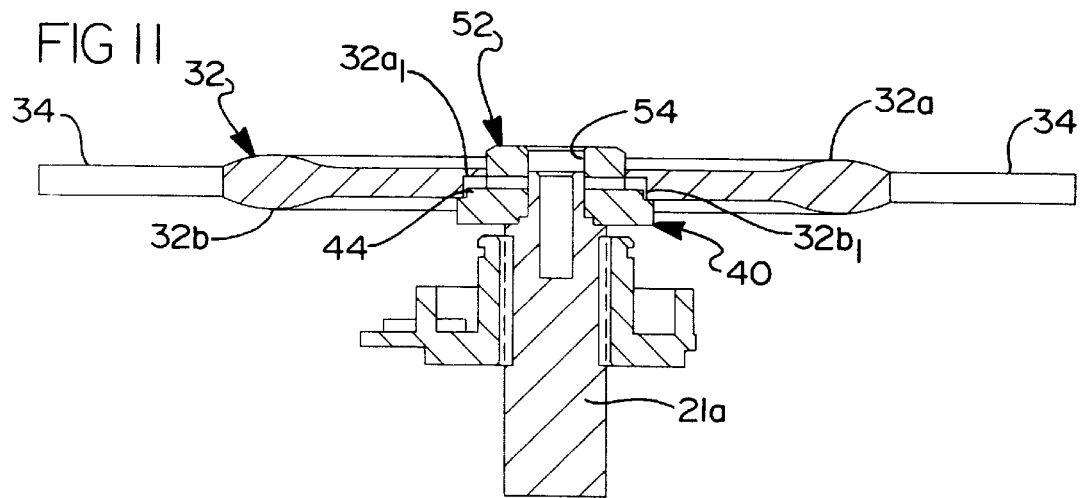
FIG. 11 is a partial cross sectional side view of the wire wheel, the keyed washer and the outer washer secured to a portion of the motor spindle, taken in accordance with section line 11—11 in FIG. 10.
Figure 12:
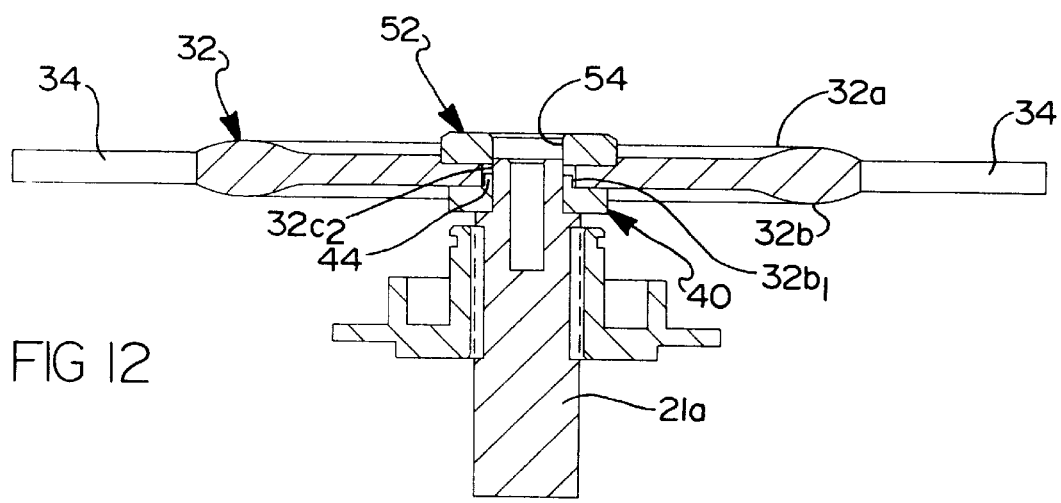
FIG. 12 is a partial cross sectional side view of the assembly of FIG. 10 taken in accordance with section line 12—12 in FIG. 10.

Referring now to FIGS. 10–12, the wire wheel 26 is shown in partial cross section assembled to the spindle 21 a of the motor 21. During assembly, the keyed washer 40 is first inserted over the spindle 21a. The keyed washer 40 is inserted such that the boss portion 44 is facing outwardly toward the terminal end of the spindle 21a. Next the wire wheel 26 is placed onto the spindle 21a such that the boss portion 44 engages with the kermit eye shaped apertures $32b_1$ and $32c_2$ in the inner plate 32b and center plate 32c, respectively, of the hub 32. At this point the wire wheel 26 will be keyed to the keyed washer 40, which is in turn keyed to the spindle 21a. Thus, neither the wire wheel 26 nor the keyed washer 40 will be able to move independently of the spindle 21a nor independently of each other.

The outer washer 52 is then placed onto the spindle 21a and it fits partially within the circular aperture $32a_1$ in the outer plate 32a. Next, a suitable fastening element (not shown) is threaded into an internal threaded bore 54 in the spindle 21a to secure the washers 40 and 52 and the wire brush 26 thereon. It will be appreciated, however, that the spindle 21a could comprise an external threaded surface and a threaded nut could be incorporated instead. Once assembled, the wire brush wheel 26 and the washers 40 and 52 are keyed to the spindle 21a, thus eliminating any possibility of slippage of the brush wheel 26 during operation of the edger 10.

Figure 13:
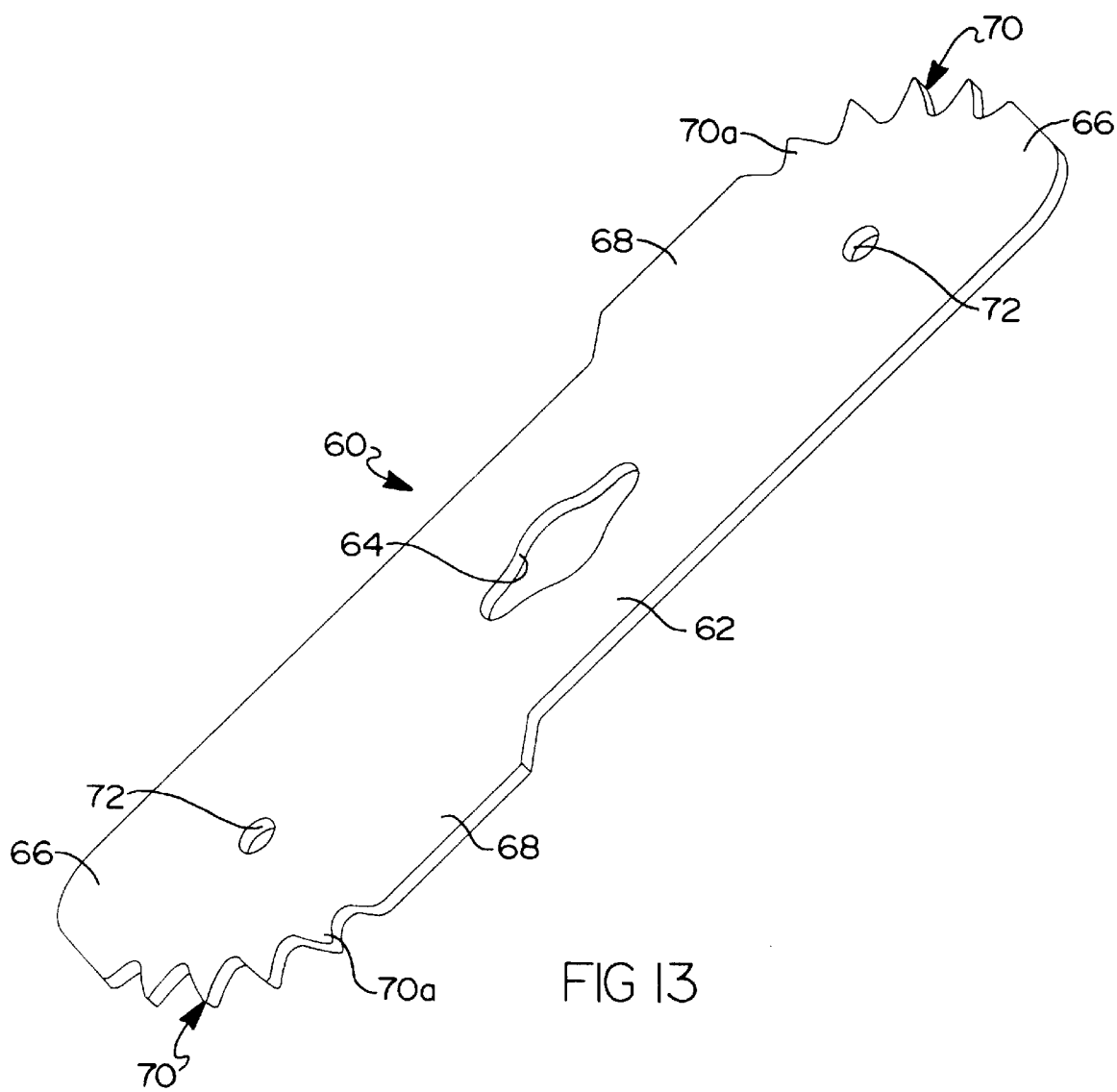
FIG. 13 is a perspective view of a cutting blade adapted for use with the present invention.

With brief reference to FIG. 13, a cutting blade 60 particularly adapted for use with the edger 10 is shown. The cutting blade comprises a central portion 62 also having a kermit eye shaped aperture 64, and opposing end portions 66. The opposing end portions each include a "step" 68 and a plurality of teeth 70. The teeth 70 are arranged along a slight arc. An aperture 72 is formed in each opposing end portion at a point inwardly toward the aperture 64 so as to be approximately above a tooth 70a nearest aperture 64. Apertures 72 form a convenient means for indicating the degree of wear of the opposing end portions 66 to indicate to the user when the blade 60 needs replacement. When replacement is needed, the loss of material of the blade 60 at the opposing ends 66 will reach apertures 72, thus providing an indication that the blade 60 needs to be replaced. At this point, all but the two teeth 70a nearest the kermit eye shaped aperture 64 will be worn away.

The edger 10 and the wire brush wheel 26 thus form an easy to use means for digging trenches, edging lawns, cleaning cracks in pavement or paving stone walkways or driveways, without damaging the surface being cleaned. The spacing of the wire brush segments 34 of the wire wheel 26 further serve to reduce the loading on the electric motor 21 of the edger 10 and to help prevent stalling of the wire wheel 26 during use of the edger. The reduced number of brush segments 34 and the manner in which the brush segments are arranged on the hub 32 enable the wire wheel 26 to be driven by less powerful electric motors and further to help prevent damage to the electric motor by reducing the risk of stalling.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, specification and following claims.

What is claimed is:

1. An edger comprising:

a housing;

an electric motor disposed within said housing, said electric motor having an output shaft;

a wire wheel fixedly secured to said output shaft, said wire wheel having a hub and a plurality of twisted wire brush segments secured radially about said hub;

said twisted wire brush segments further being arranged in pluralities adjacent radially to one another on said hub, wherein said brush segments of each said plurality are separated from one another by a first distance, and each said plurality being spaced from an adjacent said plurality by a second distance which is greater than said first distance to thereby form a plurality of gaps between adjacent ones of said pluralities, to thereby reduce a load on said motor as said edger is operated.

2. The edger of claim 1, wherein said twisted wire brush segments are disposed in pairs radially about said hub.

3. The edger of claim 1, wherein each of said wire brush segments comprises a diameter of between about 0.125 inch–0.5 inch (3.175 mm–12.7 mm).

4. The edger of claim 1, wherein each of said wire brush segments comprises a diameter of about 0.25 inch–0.375 inch (6.35 mm–9.525 mm).

5. The edger of claim 1, wherein each said gap comprises a distance of between about 0.5 inch–0.75 inch (12.7 mm–19.05 mm).

6. The edger of claim 1, wherein said hub comprises:

an inner plate;

an outer plate; and a center plate sandwiched between said inner and outer plates;

said wire brush segments extending through openings formed in said center plate; and peripheral portions of said inner and outer plates being crimped toward each other at each of said gaps to further help support said wire brush segments in an upright orientation.

7. The edger of claim 1, wherein said hub comprises a keyed opening; and wherein said output shaft of said motor comprises an non-circular cross sectional shape;

wherein said edger further comprises a keyed washer adapted to engage said output shaft of said motor in a predetermined orientation, said keyed washer having a keyed portion adapted to engage said keyed opening in said hub to prevent movement of said hub independent of said output shaft.

8. The edger of claim 7, wherein said keyed portion of said keyed washer comprises a kermit eye shape; and wherein said keyed opening in said hub comprises a kermit eye shape.

9. The edger of claim 7, further comprising an outer washer having an aperture adapted to engage said output shaft so as not to permit rotation of said outer washer independently of said output shaft.

10. An edger comprising:

a housing;

an electric motor disposed within said housing, said electric motor having an output shaft with a portion of said output shaft having a cross sectional shape forming a first keyed portion;

an edging implement having a hub and an edging portion, said hub having a keyed opening through which said portion of said output shaft may be inserted;

a washer having a central area having a keyed aperture and a keyed portion, said keyed aperture enabling said washer to receive said output shaft and to be keyed to said output shaft and said keyed portion having a configuration enabling engagement with said keyed aperture in said hub of said edging implement to thereby prevent rotation of said washer relative to said output shaft when said washer and said edging implement are disposed on said output shaft; and a fastening member engageable with said output shaft for removably securing said edging implement to said output shaft.

11. The edger of claim 10, wherein said keyed portion of said washer comprises a raised boss portion.

12. The edger of claim 11, wherein said raised boss portion comprises a kermit eye shape; and wherein said opening in said hub comprises a kermit eye shape.

13. The edger of claim 10, further comprising an outer washer having a shape adapted to engage with said hub in a manner to prevent rotation of said outer washer independently of said output shaft and independently of said hub.

14. The apparatus of claim 10 wherein said edging implement comprises a wire brush having a plurality of twisted wire brush segments extending from said hub; and said brush segments being arranged in selected pluralities radially around said hub such that each said selected plurality is spaced apart from its adjacent said selected plurality by a distance of about 0.625 inch (15.875 mm).

15. The apparatus of claim 14 wherein each said wire brush segment comprises a diameter of between about 0.125 inch–0.375 inch (6.35 mm–9.525 mm).

16. The apparatus of claim 14, wherein each said wire brush segment comprises a diameter of between about 0.25 inch–0.375 inch (6.35 mm–9.525 mm).

17. The apparatus of claim 10, wherein said edging implement comprises an edging blade, said edging blade including a central portion, opposing end portions each having a plurality of cutting teeth, and a wear indicating aperture in at least one of said opposing end portions for indicating to a user when said edging blade requires replacement.

18. An edger comprising:

an electric motor having an output shaft;

a wire wheel having a hub and a plurality of wire brush segments arranged in selected pluralities around a periphery of said hub such that each of said brush segments within any said plurality of brush segments are separated by a first distance, and wherein adjacent ones of said pluralities are separated by a second distance which is greater than said first distance, such that gaps are formed between adjacent ones of said pluralities of brush segments; and a member for keying said wire wheel to said output shaft to prevent rotation of said wire wheel independently of said output shaft.

19. The edger of claim 17, wherein said selected pluralities each comprise a pair of said wire brush segments.

20. The edger of claim 19, wherein each said pair of said wire brush segments are disposed radially adjacent one another about said hub.

21. The edger of claim 20, wherein said gaps comprise spaces of at least about 0.5 inch (12.7 mm) between adjacent ones of said selected pluralities of said brush segments.

22. The edger of claim 10 wherein said member comprises a washer having an opening adapted to be keyed to said output shaft when said washer is placed on said output shaft, to thereby prevent rotation of said washer independently of said output shaft; and wherein said washer includes a boss portion having a shape keyed to an opening in said hub to prevent rotation of said wire wheel independently of said output shaft of said motor.

23. The edger of claim 22, further comprising an outer washer having an opening adapted to be keyed to said output shaft and adapted to be placed against an outer surface of said hub for assisting in holding said wire wheel securely on said output shaft.

* * * * *

UNITED STATES PATENT AND TRADEMARK OFFICE
CERTIFICATE OF CORRECTION

PATENT NO.    : 6,293,349 B1
DATED         : September 25, 2001
INVENTOR(S)   : James Marshall et al.

It is certified that error appears in the above-identified patent and that said Letters Patent is hereby corrected as shown below:

<u>Column 8,</u>
Line 63, "claim 17" should be -- claim 18 --.

<u>Column 9,</u>
Line 4, "claim 10" should be -- claim 18 --.

Signed and Sealed this

Fifteenth Day of April, 2003

JAMES E. ROGAN
*Director of the United States Patent and Trademark Office*